(12) United States Patent
Smirnov

(10) Patent No.: US 8,179,006 B2
(45) Date of Patent: May 15, 2012

(54) MOTOR

(75) Inventor: Viatcheslav Smirnov, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 258 days.

(21) Appl. No.: 12/774,371

(22) Filed: May 5, 2010

(65) Prior Publication Data

US 2011/0127866 A1   Jun. 2, 2011

(30) Foreign Application Priority Data

Nov. 30, 2009   (KR) ........................ 10-2009-0117208

(51) Int. Cl.
*H02K 5/16* (2006.01)

(52) U.S. Cl. ....................................... 310/90; 310/67 R

(58) Field of Classification Search ................. 310/67 R, 310/89–98, 91
See application file for complete search history.

(56) References Cited

U.S. PATENT DOCUMENTS

| 4,526,484 | A  | * | 7/1985  | Stahl et al. ..................... 384/133 |
| 5,723,927 | A  | * | 3/1998  | Teshima ........................... 310/90 |
| 5,885,005 | A  | * | 3/1999  | Nakano et al. ................. 384/113 |
| 6,574,186 | B2 | * | 6/2003  | Nii et al. ......................... 369/269 |
| 7,309,937 | B2 | * | 12/2007 | Hoffmann et al. .............. 310/90 |
| 2007/0222314 | A1 | * | 9/2007 | Drautz ............................. 310/90 |
| 2008/0112306 | A1 | * | 5/2008 | Hirata et al. .................. 369/269 |
| 2010/0148606 | A1 | * | 6/2010 | Yu et al. .......................... 310/90 |
| 2011/0127865 | A1 | * | 6/2011 | Smirnov et al. ................. 310/90 |

* cited by examiner

*Primary Examiner* — Thanh Lam

(74) *Attorney, Agent, or Firm* — McDermott Will & Emery LLP

(57) ABSTRACT

A motor is disclosed. In accordance with an embodiment of the present invention, the motor includes a base, a shaft, which has an end part thereof coupled to the base, a stopper, which is coupled to the shaft and has a latch protruded in a direction of diameter of the shaft, a housing, which includes a hollow part, a ledge and an entrance and exit groove, and a rotor case, which is coupled with the housing. Here, the other end part of the shaft is inserted into the hollow part, the ledge is protruded inwardly in the hollow part such that the latch is caught, and the entrance and exit groove is penetrated through the ledge so as to allow the latch to enter and exit the entrance and exit groove.

28 Claims, 8 Drawing Sheets

FIG. 4
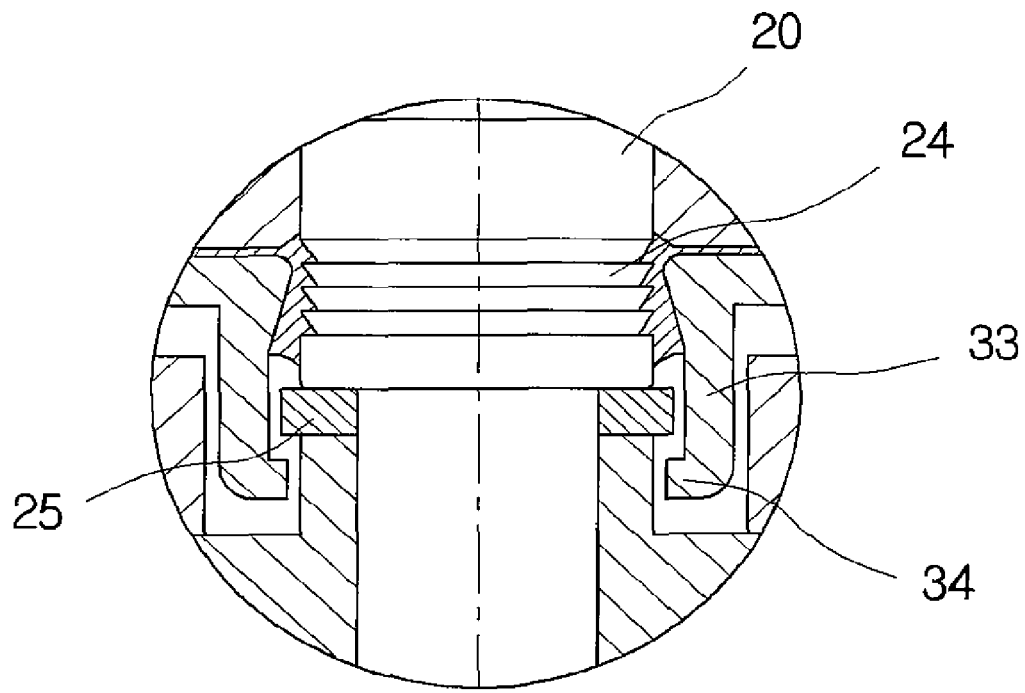
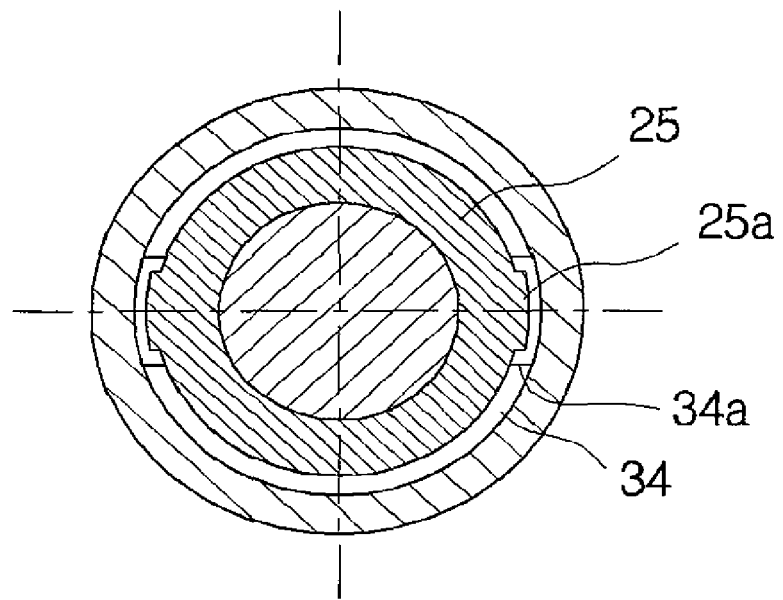

FIG. 5
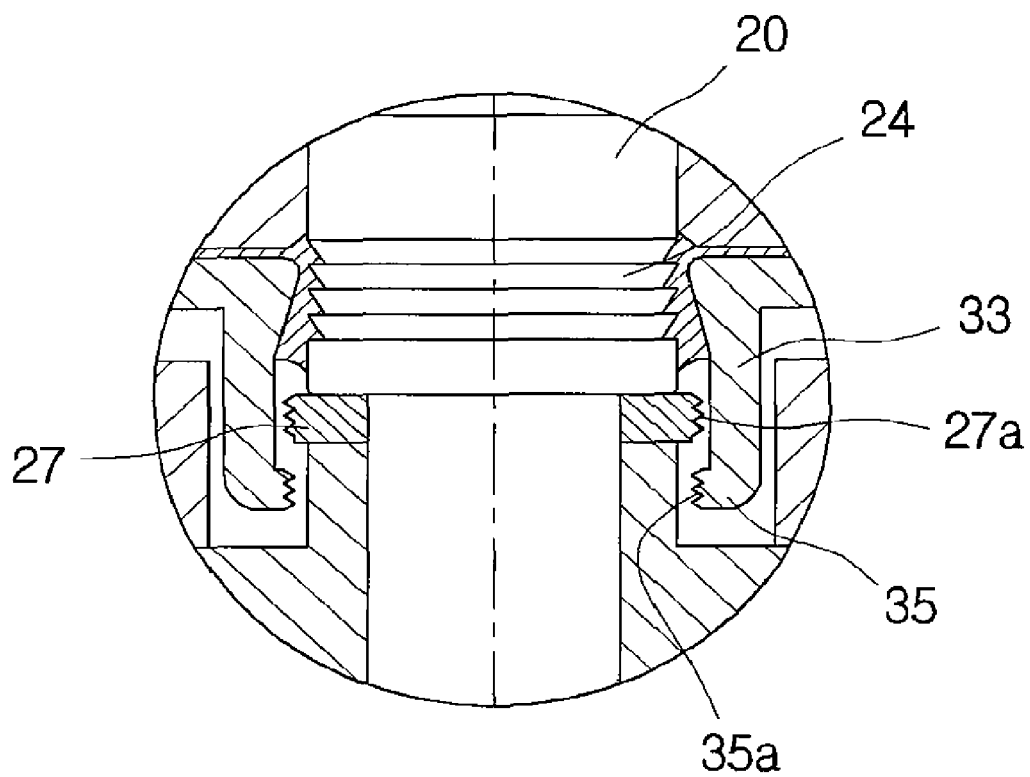
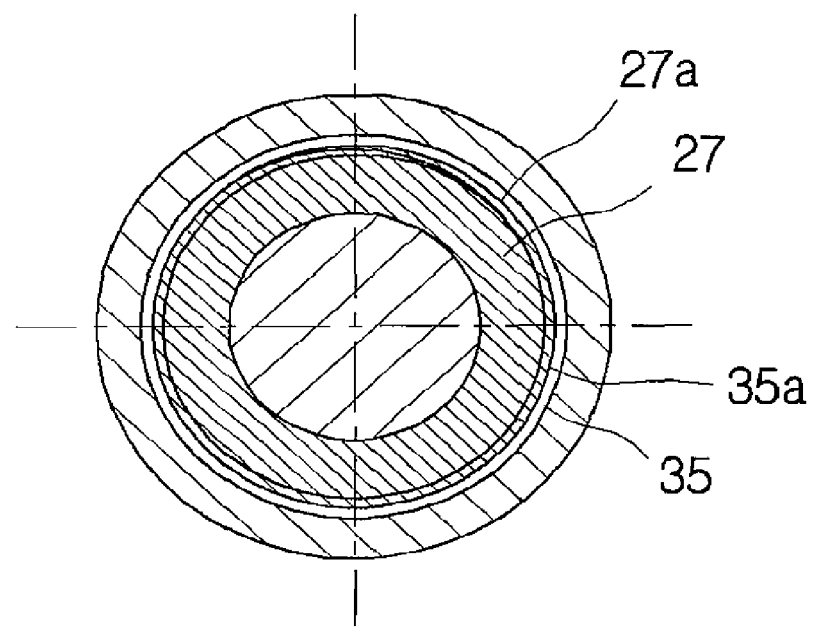

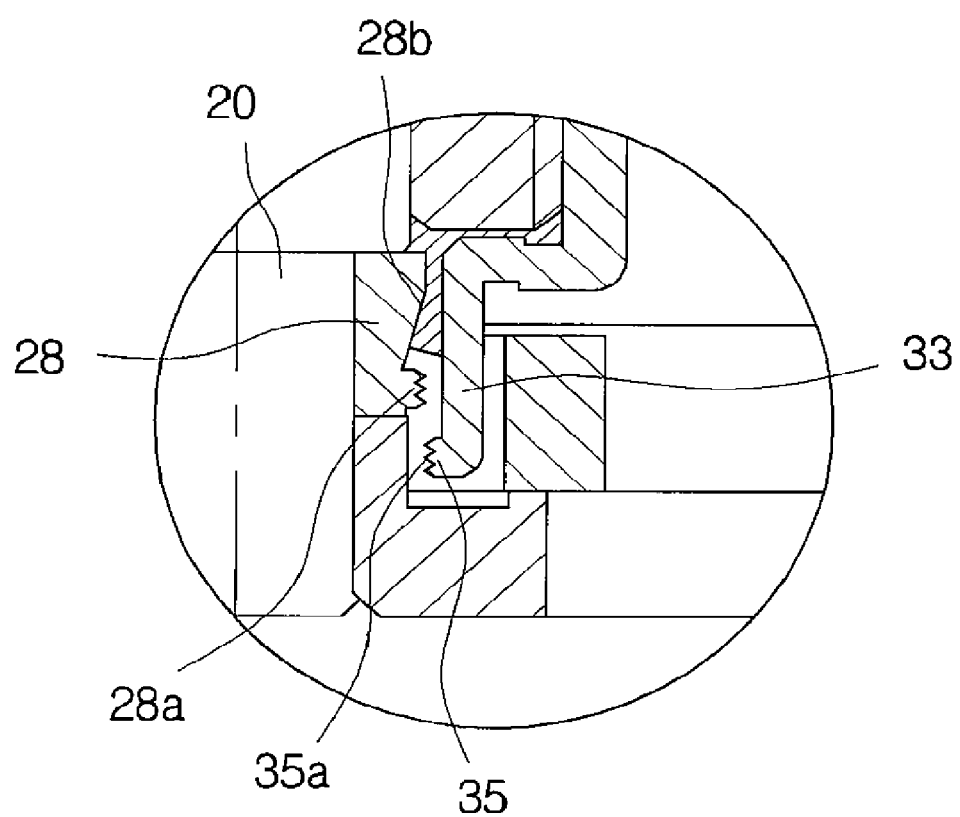

MOTOR

CROSS-REFERENCE TO RELATED APPLICATIONS

This application claims the benefit of Korean Patent Application No. 10-2009-0117208, filed with the Korean Intellectual Property Office on Nov. 30, 2009, the disclosure of which is incorporated herein by reference in its entirety.

BACKGROUND

1. Technical Field

The present invention is related to a motor.

2. Description of the Related Art

Spindle motors are commonly used in electronic products, for example, computer drives, which require a precision rotation device. The spindle motors are extremely promising because, despite their small size, they can be rotated at a high speed with less power and can be readily controlled with high precision.

In a conventional motor, a rotor coupled to a rotational axis is supported by a stator to rotate.

However, as the conventional spindle motor becomes thinner, the section of the stator for supporting the rotational axis becomes smaller, making it difficult to provide reliability of rotation in a thin spindle motor.

Furthermore, it is difficult or almost impossible to disassemble the motor, making it difficult to maintain and repair the motor.

SUMMARY

The present invention provides a thinner motor that can rotate with reliable stability.

The present invention also provides a motor that can be assembled and disassembled with ease.

An aspect of the present invention provides a motor that includes a base, a shaft, which has an end part thereof coupled to the base, a stopper, which is coupled to the shaft and has a latch protruded in a direction of diameter of the shaft, a housing, which includes a hollow part, a ledge and an entrance and exit groove, and a rotor case, which is coupled with the housing. Here, the other end part of the shaft is inserted into the hollow part, the ledge is protruded inwardly in the hollow part such that the latch is caught, and the entrance and exit groove is penetrated through the ledge so as to allow the latch to enter and exit the entrance and exit groove The rotor case can include an insertion hole, which has the housing inserted therein, and a supporting wall, which supports an outer circumferential surface of the inserted housing.

The rotor case can include an insertion groove, which is formed in a depressed portion of the rotor case to correspond to an outer shape of the housing and in which the insertion groove has the insertion hole and the supporting wall.

The housing can further include an oil leak prevention wall surrounding the shaft, in which an inner diameter of the oil leak prevention wall expands toward an outer side.

A taper can be formed on the oil leak prevention wall, in which the taper expands an inner diameter of the oil leak prevention wall.

The ledge can be formed on an end part of the oil leak prevention wall.

The motor can further include a porous bearing, which is interposed between the shaft and the housing and in which the porous bearing has a porous structure so that oil can pass through the porous bearing.

An oil return groove can be formed on an outer circumferential surface of the shaft inserted into the housing.

The oil return groove can include a flange facing a direction of oil circulation.

A taper can be formed on the stopper, in which an outer diameter of the taper becomes narrower toward the base.

The motor can further include a magnetic member installed on the base and disposed to face the housing.

The motor can further include an electromagnet coupled to the base.

The base can further include a base plate and a supporter, which is coupled to the base plate and supports the shaft and the electromagnet.

The base can further include a base plate having a plate part and a supporting part, in which the plate part supports the shaft and the supporting part is bent from the plate part to support the electromagnet.

Another aspect of the present invention provides a motor that includes a base, a shaft, which has an end part thereof coupled to the base, a stopper, which is coupled to the shaft and has a first thread formed on an outer circumferential surface of the stopper, a housing, which includes a hollow part and a ledge, and a rotor case, which is coupled with the housing. Here, the other end part of the shaft is inserted into the hollow part, and the ledge is protruded inwardly in the hollow part and has a second thread formed on an inner circumferential surface of the ledge to correspond to the first thread.

The rotor case can include an insertion hole, which has the housing inserted therein, and a supporting wall, which supports an outer circumferential surface of the inserted housing.

The rotor case can include an insertion groove, which is formed in a depressed portion of the rotor case to correspond to an outer shape of the housing and in which the insertion groove has the insertion hole and the supporting wall.

The housing can further include an oil leak prevention wall surrounding the shaft, in which an inner diameter of the oil leak prevention wall expands toward an outer side.

A taper can be formed on the oil leak prevention wall, in which the taper expands an inner diameter of the oil leak prevention wall.

The ledge can be formed on an end part of the oil leak prevention wall.

The motor can further include a porous bearing interposed between the shaft and the housing, in which the porous bearing has a porous structure so that oil can pass through the porous bearing.

An oil return groove can be formed on an outer circumferential surface of the shaft inserted into the housing.

The oil return groove can include a flange facing a direction of oil circulation.

A taper can be formed on the stopper, in which an outer diameter of the taper becomes narrower toward the base.

The motor can further include a magnetic member installed on the base and disposed to face the housing.

The motor can further include an electromagnet coupled to the base.

The base can further include a base plate and a supporter, which is coupled to the base plate and supports the shaft and the electromagnet.

The base can further include a base plate having a plate part and a supporting part, in which the plate part supports the shaft and the supporting part is bent from the plate part to support the electromagnet.

Additional aspects and advantages of the present invention will be set forth in part in the description which follows, and in part will be obvious from the description, or may be learned by practice of the invention.

BRIEF DESCRIPTION OF THE DRAWINGS

FIGS. 4 and 5 show the oil leak prevention structure and stopper of a motor in accordance with an embodiment of the present invention.

FIG. 8 shows a stopper in a motor in accordance with another embodiment of the present invention.

DETAILED DESCRIPTION

The features and advantages of this invention will become apparent through the below drawings and description.

Figure 1:
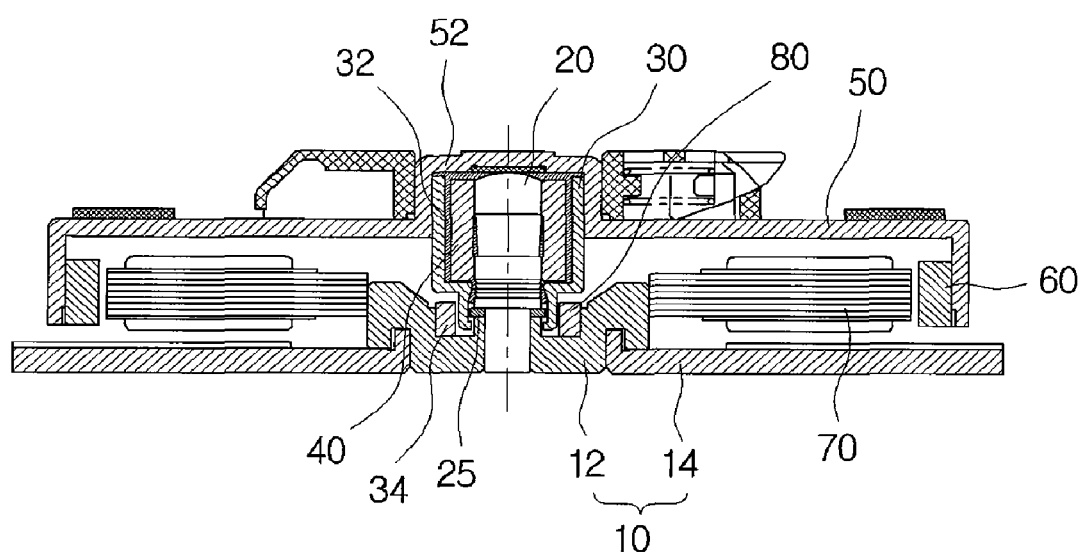
FIG. 1 is a cross-sectional view of a motor in accordance with an embodiment of the present invention.
Figure 2:
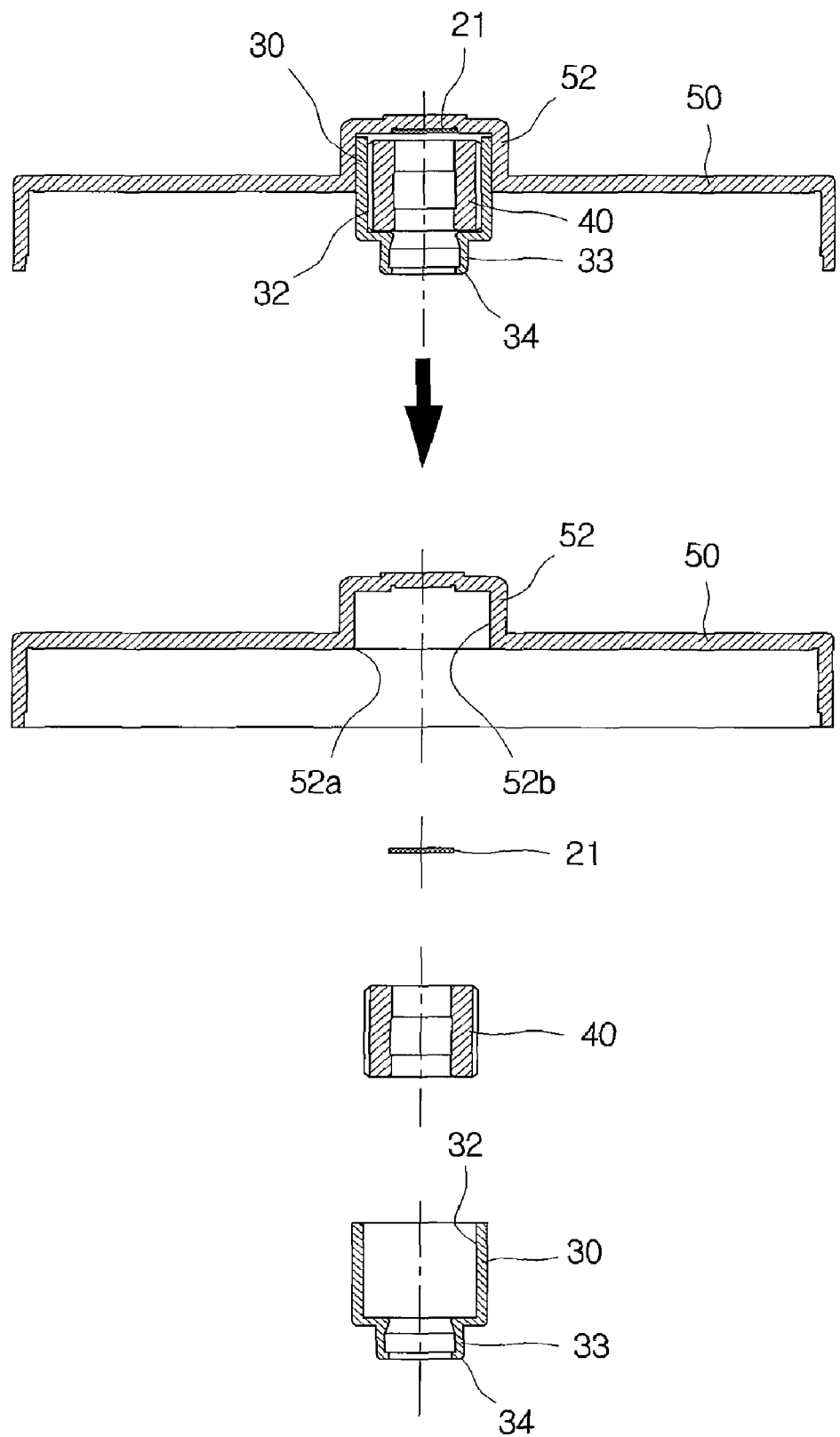
FIGS. 2 and 3 are exploded views of a motor in accordance with an embodiment of the present invention.
Figure 3:
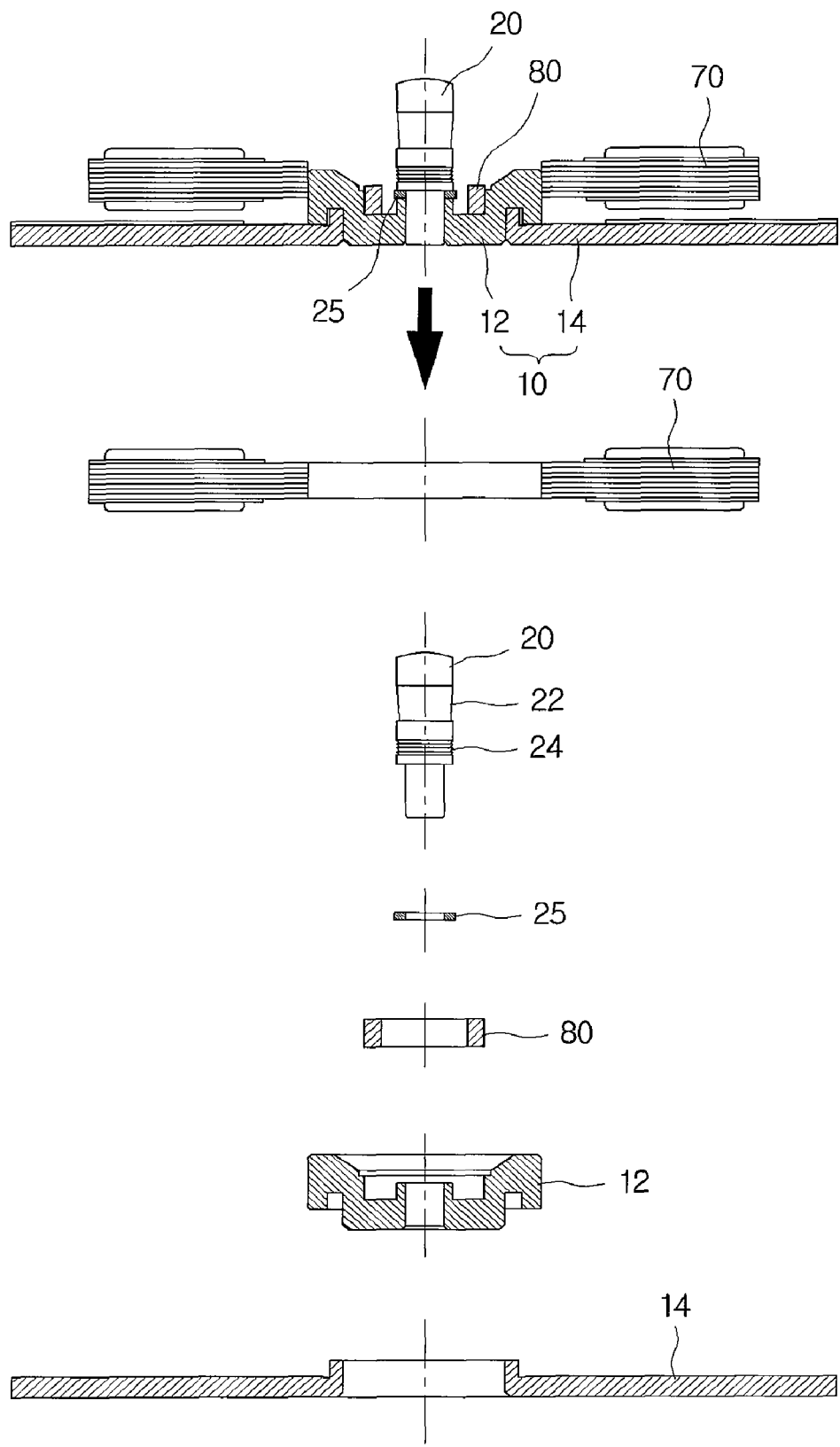

FIG. 1 is a cross-sectional view of a motor in accordance with an embodiment of the present invention, and FIGS. 2 and 3 are exploded views of a motor in accordance with an embodiment of the present invention.

The motor in accordance with an embodiment of the present invention includes a base 10, a shaft 20, a stopper 25, a housing 30 and a rotor case 50. The motor of the present embodiment can include an electromagnet 70 and a permanent magnet 60 in order to generate a rotational force by using a magnetic force.

The base 10 supports the entire motor and is coupled to an end part of the shaft 20 that supports the housing 30 and the rotor case 50, which will be described later.

The base 10 of the present embodiment can include a base plate 14 and a supporter 12 coupled to the base plate 14. Specifically, as illustrated in FIG. 3, the supporter 12 can be coupled to the base plate 14 by being inserted into a through-hole formed in the base plate 14, and an end part of the shaft 20 can be coupled to the supporter 12. The supporter 12 can support the electromagnet unit 70 and the shaft 20 together.

Figure 7:
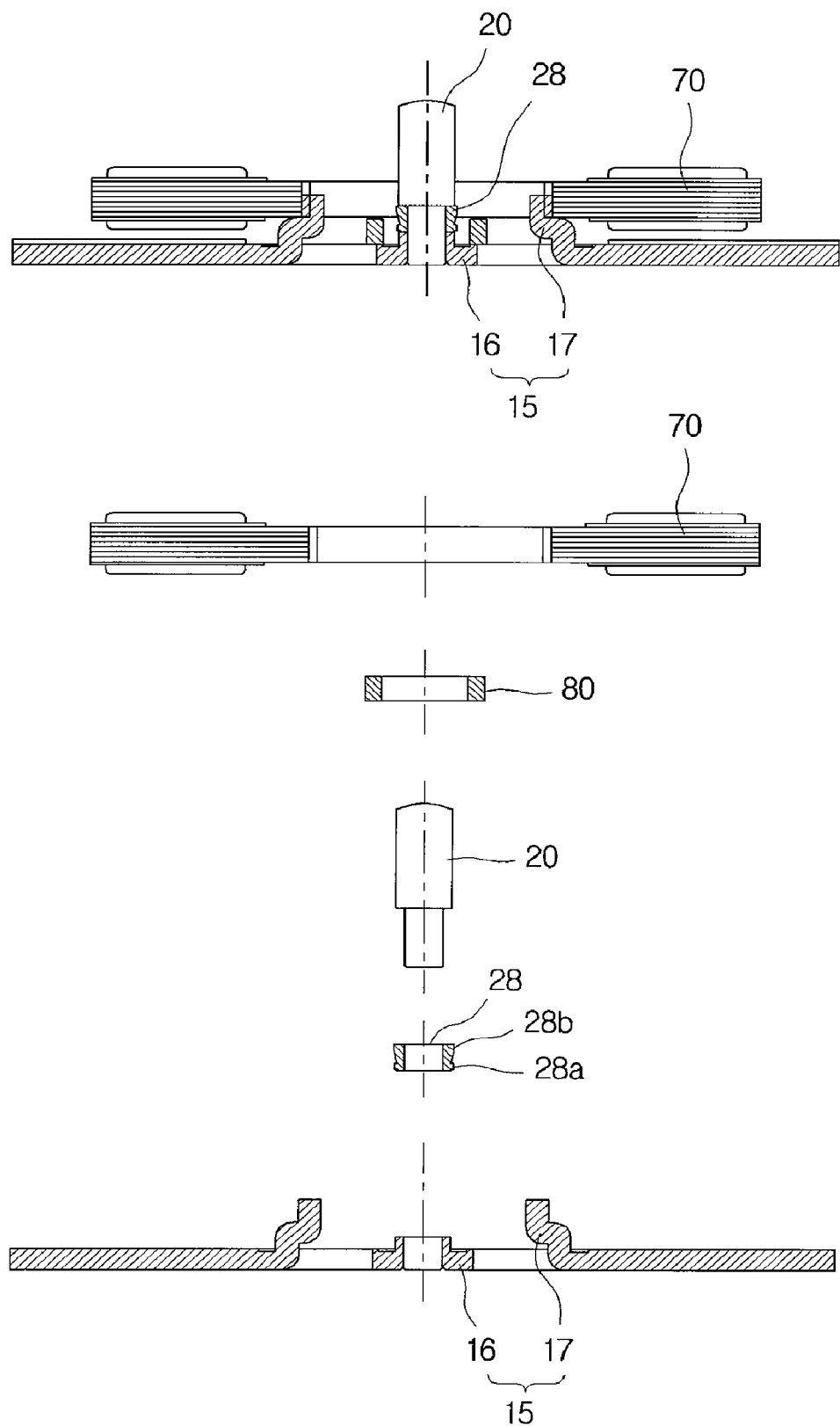
FIG. 7 is an exploded view of a motor in accordance with another embodiment of the present invention.

Also, as illustrated in FIG. 7, the shaft 20 and the electromagnet unit 70 can be supported by a base plate 15. For this, the base plate 15 can include a plate part 16, by which the shaft 20 is supported, and a supporting part 17, which is bent from the plate part 16 to support the electromagnet unit 70.

Meanwhile, a magnetic member 80, which applies a gravitational force by a magnetic force to the housing 30, can be installed on the base 10 in order to prevent levitation of a rotating body by the rotation of the rotating body. Specifically, the magnetic member 80 is disposed on one surface of the base 10 facing the housing 30 to face the housing 30 and pulls down the metal housing 30 in order to prevent the housing 30 and the rotor case 50 coupled to the housing 30 from being levitated and detached by the rotation of the housing 30 and the rotor case 50.

The shaft 20 rotatably supports the housing 30 and the rotor case 50, which are rotating bodies, and is supported by having an end part of the shaft 20 coupled to the base 10. The shaft 20 of the present embodiment is supported by the base 10 by being coupled to the supporter 12.

The housing 30 and the rotor case 50 are coupled to each other and become a rotating body that rotates about the center of the shaft 20.

For this, the housing 30 of the present embodiment has a hollow part 32, into which the other end part of the shaft 20 is inserted, formed therein, and the rotor case 50 has an insertion hole 51, to which the housing 30 is inserted and coupled, formed therein. In this configuration, the motor of the present embodiment can have a structure in which the shaft 20 supports and rotates a rotating body that is formed by the housing 30 and the rotor case 50.

Figure 6:
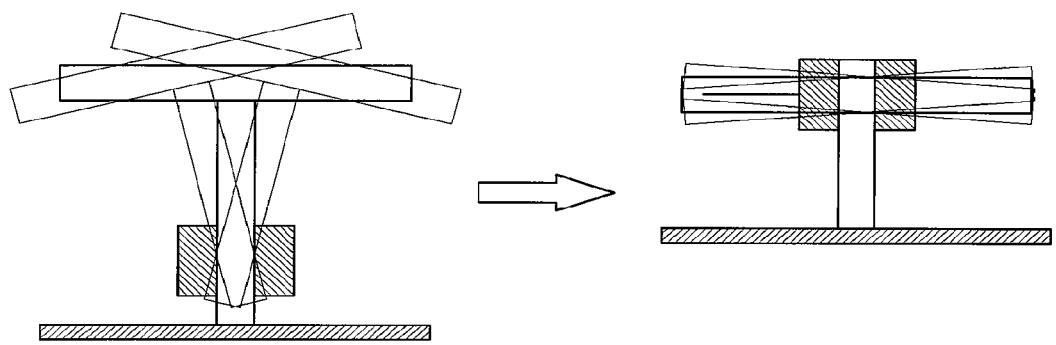
FIG. 6 shows a property of a motor in accordance with an embodiment of the present invention.

FIG. 6 shows a property of a motor in accordance with an embodiment of the present invention.

As illustrated in FIG. 6, the structure in which the shaft 20 supports and rotates the rotating body minimizes the deviation in vibration when the rotating body rotates, compared to a conventional rotating body, which rotates together with a rotational axis as a single body. Thus, with the same length of a rotating body supporting area as that of the convention motor, the motor of the present embodiment can stably support a rotating body.

Particularly, the motor of the present embodiment can allow the housing 30 and shaft 20 lengthy such that the rotating body can be supported more stably even in a thinner structure.

For this, an outwardly-protruded supporting wall 52, which supports the housing 30, is formed in the center of the rotor case 50. As a result, while the height of the supporting surface, which supports an object to be rotated (not shown), for example, a disk, of the rotor case 50 can be decreased, a sufficient length of the housing 30 that supports the shaft 20 can be obtained.

Furthermore, the supporting wall 52 of the rotor case 50 can also function to readily align the rotational center of the motor. In the conventional motor, a rotational axis is directly coupled to the rotor case 50, and thus it is difficult to make the rotor case 50 perpendicular to the rotational axis. Conversely, in the motor of the present embodiment, since the housing 30 having a relatively wider diameter is coupled to the rotor case 50, it becomes easier to make the rotor case 50 perpendicular to the housing 30, allowing an easier assembly of the rotor case 50 with the housing 30.

Specifically, as illustrated in FIG. 2, an insertion groove 52 can be formed in a depressed portion of the rotor case 50 to correspond to the outer shape of the housing 30. Accordingly, the entrance of the insertion groove 52 becomes an insertion hole 52a, and an inner surface of the insertion groove 52 becomes a supporting wall 52b.

Here, a lower surface of the insertion groove 52 can also function to support the shaft 20. Specifically, a thrust washer 21 supporting the shaft 20 can be installed on the lower surface of the insertion groove 52, and the hollow part of the housing 30 can be opened toward the rotor case 50. Thus, the shaft 20 having penetrated through the housing 30 can be supported by the insertion groove 52 having the thrust washer 21 installed therein, thereby simplifying the configuration and assembly of the housing 30.

Meanwhile, in the housing 30 of the present embodiment, oil can be filled in the hollow part 32 for smooth rotation of the housing 30, and an oil leak prevention wall 33 can be additionally formed around the entrance of the hollow part 32 in order to prevent the filled oil from leaking.

FIGS. 4 and 5 show the oil leak prevention structure and stopper of a motor in accordance with an embodiment of the present invention.

As illustrated in FIG. 4, the oil leak prevention wall 33, which surrounds the shaft 20 by being protruded toward the outside of the housing 30 and has a wider inner diameter toward an outer side, can be additionally formed in the housing 30 of the present embodiment. Specifically, the oil leak prevention wall 33 can be tapered to expand the inner diameter toward the outside. Therefore, the oil filled in the housing 30 can be prevented from leaking to the outside of the housing 30 by an interface that is formed by the oil leak prevention wall 33.

Furthermore, in the motor of the present embodiment, a porous bearing 40 can be interposed between the shaft 20 and the housing 30, allowing the motor to rotate more smoothly. Since a large number of continuously formed spaces are formed in the porous bearing 40, for example, a sintered bearing, oil can be filled in or passed through the porous bearing 40. Accordingly, by using a centrifugal force to circulate the oil when the motor rotates, friction between the shaft 20 and the porous bearing 40 can be minimized.

For smooth circulation of the oil, a circulation groove (not shown), through which oil circulates, can be formed on an outer circumferential surface of the porous bearing 40 so that the oil pushed toward the outside of the porous bearing 40 by the centrifugal force can be fed back.

Also, oil return grooves 22 and 24 can be formed on an outer circumferential surface of the shaft 20 in order to prevent the oil from gravitating toward the entrance of the hollow part 32 by, for example, the gravity. As illustrated in FIG. 4, the oil having flowed along the space between the porous bearing 40 and the shaft 20 can be guided to the inside of the porous bearing 40 because the oil can flow along the oil return groove 24.

By disposing the oil return groove 24 adjacent to a lower end part of the porous bearing 40, the oil having passed through the porous bearing 40 can be also prevented from leaking to the outside of the housing 30.

Particularly, by forming a flange that faces the direction of circulation of the oil on the oil return groove 24, the amount of the oil guided to the inside of the porous bearing 40 can be increased, and the oil can be further prevented from flowing to the outside of the housing 30.

The stopper 25 prevents the rotating body, formed by having the housing 30 and the rotor case 50 coupled to each other, from being detached from the shaft 20 and is coupled to the shaft 20.

Particularly, in the motor of the present embodiment, a ledge 34, which supports the stopper 25, and an entrance and exit groove 34a, which allows the stopper 25 to enter and exit, are formed in the housing 30 such that the housing 30 is prevented from being detached from the shaft 20 when the housing 30 rotates and is readily detached from the shaft 20 when the housing 30 is disassembled.

As illustrated in FIG. 4, the ledge 34 is protruded inwardly in the hollow part 32 such that the stopper 25 inside the hollow part 32 can be supported. The ledge 34 of the present embodiment is protruded inwardly from an end part of the oil leak prevention wall 33. Then, a latch 25a, which is protruded in the direction of the diameter of the shaft 20 (that is, toward an inner wall of the hollow part 32 of the housing 30), is formed on the stopper 25. The ledge 34 has the entrance and exit groove 34a formed therein to correspond to the latch 25a so as to allow the latch 25a to enter and exit through the entrance and exit groove 34a.

Accordingly, when the motor rotates, the ledge 34 keeps the latch 25a inside the hollow part 32 of the housing 30. Also, when the motor is disassembled or assembled, the latch 25a can be taken out or in the hollow part 32 through the entrance and exit groove 34a. Since the entrance and exit groove 34a is formed only on a certain portion of the ledge 34 and the rotating body is prevented from being levitated by the magnetic member 80 described above, it is very unlikely that the latch 25a is detached through the entrance and exit groove 34a when the motor rotates.

Also, as illustrated in FIGS. 5 and 8, first threads 27a and 28a can be formed on an outer circumferential surface of the stopper 25, and a second thread 35a, corresponding to the first threads 27a and 28a, can be formed on an inner circumferential surface of the ledge 34, thereby facilitating the disassembling and assembling of the motor.

Accordingly, when assembling the motor, the housing 30 having the second thread 35a formed thereon can be rotated in the direction of screwing to take the stopper 25 having the first thread 27a formed thereon in the hollow part 32 of the housing 30. Conversely, when disassembling the motor, the housing 30 can be rotated in the direction of unscrewing to take the stopper 25 out of the hollow part 32.

Meanwhile, as illustrated in FIG. 8, a taper 28b, which has a narrower outer diameter toward the base 10, can be formed on the stopper 25. Accordingly, an interface that prevents the oil filled in the housing 30 from leaking can be formed between the housing 30 and the stopper 25.

By utilizing certain embodiments of the present invention as set forth above, a sufficient area for supporting a rotating body can be provided even in a thinner structure.

Moreover, alignment and assembly of a rotational center can be performed more easily.

Furthermore, a motor can be assembled and disassembled more easily, and the maintenance and repair of the motor become easier.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

As such, many embodiments other than those set forth above can be found in the appended claims.

What is claimed is:
1. A motor comprising:
   a base;
   a shaft having an end part thereof coupled to the base;
   a stopper coupled to the shaft and having a latch protruded in a direction of diameter of the shaft;
   a housing comprising a hollow part, a ledge and an entrance and exit groove, the other end part of the shaft being inserted into the hollow part, the ledge being protruded inwardly in the hollow part such that the latch is caught, the entrance and exit groove being penetrated through the ledge so as to allow the latch to enter and exit the entrance and exit groove; and
   a rotor case coupled with the housing.
2. The motor of claim 1, wherein the rotor case comprises:
   an insertion hole having the housing inserted therein; and
   a supporting wall configured to support an outer circumferential surface of the inserted housing.
3. The motor of claim 2, wherein the rotor case comprises an insertion groove formed in a depressed portion of the rotor case to correspond to an outer shape of the housing, the insertion groove having the insertion hole and the supporting wall.
4. The motor of claim 1, wherein the housing further comprises an oil leak prevention wall surrounding the shaft, an inner diameter of the oil leak prevention wall expanding toward an outer side.

5. The motor of claim 4, wherein a taper is formed on the oil leak prevention wall, the taper expanding an inner diameter of the oil leak prevention wall.

6. The motor of claim 4, wherein the ledge is formed on an end part of the oil leak prevention wall.

7. The motor of claim 1, further comprising a porous bearing interposed between the shaft and the housing, the porous bearing having a porous structure so that oil can pass through the porous bearing.

8. The motor of claim 7, wherein an oil return groove is formed on an outer circumferential surface of the shaft inserted into the housing.

9. The motor of claim 8, wherein the oil return groove comprises a flange facing a direction of oil circulation.

10. The motor of claim 1, wherein a taper is formed on the stopper, an outer diameter of the taper becoming narrower toward the base.

11. The motor of claim 1, further comprising a magnetic member installed on the base and disposed to face the housing.

12. The motor of claim 1, further comprising an electromagnet unit coupled to the base.

13. The motor of claim 12, wherein the base further comprises:
   a base plate; and
   a supporter coupled to the base plate and configured to support the shaft and the electromagnet unit.

14. The motor of claim 12, wherein the base further comprises a base plate having a plate part and a supporting part, the plate part configured to support the shaft, the supporting part being bent from the plate part to support the electromagnet unit.

15. A motor comprising:
   a base;
   a shaft having an end part thereof coupled to the base;
   a stopper coupled to the shaft and having a first thread formed on an outer circumferential surface of the stopper;
   a housing comprising a hollow part and a ledge, the other end part of the shaft being inserted into the hollow part, the ledge being protruded inwardly in the hollow part and having a second thread formed on an inner circumferential surface of the ledge to correspond to the first thread; and
   a rotor case coupled with the housing.

16. The motor of claim 15, wherein the rotor case comprises:
   an insertion hole having the housing inserted therein; and
   a supporting wall configured to support an outer circumferential surface of the inserted housing.

17. The motor of claim 16, wherein the rotor case comprises an insertion groove formed in a depressed portion of the rotor case to correspond to an outer shape of the housing, the insertion groove having the insertion hole and the supporting wall.

18. The motor of claim 15, wherein the housing further comprises an oil leak prevention wall surrounding the shaft, an inner diameter of the oil leak prevention wall expanding toward an outer side.

19. The motor of claim 18, wherein a taper is formed on the oil leak prevention wall, the taper expanding an inner diameter of the oil leak prevention wall.

20. The motor of claim 18, wherein the ledge is formed on an end part of the oil leak prevention wall.

21. The motor of claim 15, further comprising a porous bearing interposed between the shaft and the housing, the porous bearing having a porous structure so that oil can pass through the porous bearing.

22. The motor of claim 21, wherein an oil return groove is formed on an outer circumferential surface of the shaft inserted into the housing.

23. The motor of claim 22, wherein the oil return groove comprises a flange facing a direction of oil circulation.

24. The motor of claim 15, wherein a taper is formed on the stopper, an outer diameter of the taper becoming narrower toward the base.

25. The motor of claim 15, further comprising a magnetic member installed on the base and disposed to face the housing.

26. The motor of claim 15, further comprising an electromagnet unit coupled to the base.

27. The motor of claim 26, wherein the base further comprises:
   a base plate; and
   a supporter coupled to the base plate and configured to support the shaft and the electromagnet unit.

28. The motor of claim 26, wherein the base further comprises a base plate having a plate part and a supporting part, the plate part configured to support the shaft, the supporting part being bent from the plate part to support the electromagnet unit.

* * * * *